United States Patent
Mori et al.

(10) Patent No.: US 7,129,702 B2
(45) Date of Patent: Oct. 31, 2006

(54) XY STAGE, HEAD CARRIAGE AND TESTER OF MAGNETIC HEAD OR MAGNETIC DISK

(75) Inventors: Kyoichi Mori, Kanagawa (JP); Fujio Yamasaki, Kanagawa (JP); Toshinori Sugiyama, Kanagawa (JP)

(73) Assignee: Hitachi High-Technologies Corporation, Tokyo (JP)

( * ) Notice: Subject to any disclaimer, the term of this patent is extended or adjusted under 35 U.S.C. 154(b) by 208 days.

(21) Appl. No.: 10/803,904

(22) Filed: Mar. 19, 2004

(65) Prior Publication Data

US 2004/0183527 A1 Sep. 23, 2004

(30) Foreign Application Priority Data

Mar. 20, 2003 (JP) ............................. 2003-076965

(51) Int. Cl.
- *G01R 33/12* (2006.01)
- *G05G 11/00* (2006.01)

(52) U.S. Cl. .................... 324/212; 324/210; 74/490.09

(58) Field of Classification Search ................ 324/212, 324/210, 262; 33/1 M; 74/490.09, 16, 490.13; 248/646, 660, 661; 108/20, 138, 143

See application file for complete search history.

(56) References Cited

U.S. PATENT DOCUMENTS

| | | | | |
|---|---|---|---|---|
| 5,114,302 A | * | 5/1992 | Meisser et al. .......... 414/751.1 |
| 5,427,451 A | * | 6/1995 | Schmidt ..................... 366/208 |
| 5,726,073 A | * | 3/1998 | Zhang et al. ................. 438/20 |
| 6,140,815 A | | 10/2000 | Greene et al. |
| 6,363,809 B1 | * | 4/2002 | Novak et al. ............ 74/490.09 |
| 6,370,787 B1 | * | 4/2002 | Kikuchi ...................... 33/503 |
| 6,483,300 B1 | * | 11/2002 | Severson et al. .......... 324/212 |
| 6,510,614 B1 | * | 1/2003 | Kato et al. .................... 33/1 M |
| 6,510,755 B1 | * | 1/2003 | Higuchi et al. .......... 74/490.09 |
| 6,531,867 B1 | * | 3/2003 | Greene et al. ............. 324/262 |
| 6,566,870 B1 | * | 5/2003 | Sorenson et al. .......... 324/210 |
| 6,629,471 B1 | * | 10/2003 | Uchimi ................... 74/490.09 |
| 2002/0027435 A1 | * | 3/2002 | Sorenson et al. .......... 324/212 |

FOREIGN PATENT DOCUMENTS

JP 5-126973 5/1993

\* cited by examiner

*Primary Examiner*—Edward Lefkowitz
*Assistant Examiner*—Keneth J. Whittington
(74) *Attorney, Agent, or Firm*—Mattingly, Stanger, Malur & Brundidge, P.C.

(57) ABSTRACT

An XY stage includes a movable frame having a rectangular space inside thereof and movable on a reference base along one of X and Y axes, a first drive source provided in the reference base for moving the movable frame, a rectangular movable base mounted in the rectangular space of the movable frame, which is movable on the reference base along the other of the X and Y axes and stopped on the reference base, and a second drive source provided in the movable frame, for moving the movable base.

11 Claims, 6 Drawing Sheets

XY STAGE, HEAD CARRIAGE AND TESTER OF MAGNETIC HEAD OR MAGNETIC DISK

BACKGROUND OF THE INVENTION

1. Field of the Invention

The present invention relates to an XY stage, a head carriage and a tester of magnetic head or magnetic disk. In particular, the present invention relates to a bearing-supported movable stage to be utilized in a low vibration head carriage utilizing a surface plate formed of stone, which can be moved at high speed and rapidly stopped with small stopping position error and can provide a micro positioning suitable for a magnetic head tester or a magnetic disk tester.

2. Prior Art

It is a recent tendency that a composite magnetic head having an MR head, a GMR head and TMR head, etc., which are assembled on a read-out side the head, is used as a magnetic head of a hard disk device. Packaging density of the composite magnetic head is rapidly increased to several GB per inch and the track number thereof is increased to 10,000/inch or more. Further, the track number is still increasing, so that the track width is decreasing. Therefore, a head carriage (a movable base) of a tester for testing a magnetic disk or a magnetic head requires low vibration and highly precise positioning and, moreover, it requires a highly clean environment.

A tester for testing a magnetic disk or a magnetic head, which has a reference base having a surface plate of stone such as gabbro, linear motors mounted on the surface plate and a head carriage (a movable base of the head carriage) supported by air-bearings and tests the magnetic disk or the magnetic head by moving the head carriage, is disclosed in U.S. Pat. No. 6,140,815, of which Application corresponds to JP2002-518777A (referred to as "Reference No. 1", hereinafter).

On the other hand, with increase of pattern density and/or high miniaturization (or high integration) in the electronic field, an external appearance test on fine defects of a finely processed surface of such as a wiring pattern of a printed circuit board, a semiconductor wafer, a photo mask and a magnetic disk (for example, extraneous material, disconnection of a wiring pattern, short-circuit, protrusion, crack, other defects and pinhole, etc.) is performed by utilizing an air-mount system in which a movable base of an external appearance tester is mounted on a reference base of a stone surface plate. An example of such system is disclosed in JP H5-126973A.

FIG. 6 is a perspective view of a conventional magnetic head tester or a magnetic disk tester disclosed in Reference No. 1.

In FIG. 6, reference numeral 10 depicts a turning stand platform, 12 an air-bearing supported micro positioning carriage, 14 and 18 linear motors, 15 and 19 increment position encoders, 16 an air-bearing spindle carriage and 20 a pedestal formed of granite or gabbro.

The tester disclosed in Reference No. 1 includes an XY stage movable on a stone surface plate. The XY stage has an X axis and a Y axis and is driven along the axes by the respective linear motors 14 and 18 and performs a coarse positioning on one hand and a micro positioning on the other hand, with an aid of piezoelectric actuators. By using the XY stage, the tester tests a magnetic head by positioning the magnetic head in a predetermined track of a magnetic disk supported by the micro positioning carriage.

The feature of the technique disclosed in Reference No. 1 resides in that, in order to move the magnetic head to a predetermined track at high speed and brings it to a sudden stop at the track, the air-bearings are deflated by suction when it is stopped. In more detail, a small recessed region and a large recessed region are formed in the air-bearing supported micro positioning carriage 12 to provide a high vacuum region and a low vacuum region. A stop control of the movable base in the carriage is performed by deflating the regions by suction to lock down the movable base on the stone surface plate to thereby fix it in the predetermined track of the magnetic disk. Further, in the tester disclosed in Reference No. 1, the air-bearing supported micro positioning. carriage 12 and the air-bearing supported spindle carriage 16 can move in one plane by separating the moving axes on the spindle side from the moving axes on the carriage side and thin air film is removed by suction. Therefore, even when a gap between the magnetic disk and the read head becomes minute, a head test can be done with high positional preciseness.

However, since, in the head carriage utilizing the air-bearing supported stone surface plate and using such vacuum lock system, the vacuum suction of air is performed in the stop control of the movable base, it takes a time until the movable base (head carriage) is stopped stably. Further, since the spindle motor system is moved on the reference base of the surface plate, rotational vibration of the spindle is transmitted to the movable positioning system of the spindle in the positioning state and, therefore, there is a problem that the position at which the spindle is positioned may pulsate. This may influence the minute gap between the magnetic disk and the read head, causing a problem that a detection error occurs, S/N ratio is lowered and a high precision head or disk test becomes impossible.

SUMMARY OF THE INVENTION

The present invention was made in view of the above-mentioned state of art and an object of the present invention is to provide an XY stage, which has substantially no positional deviation in height direction and has a small positioning error in X and Y directions.

Another object of the present invention is to provide a head carriage and a magnetic head or disk tester, which can test a magnetic head or a magnetic disk with high precision by using the above mentioned XY stage.

In order to achieve the above objects, an XY stage of the present invention, which is supported by a surface plate reference base, comprises a movable frame having a rectangular space therein and movable on the reference base along one of X and Y axes, a first drive source provided in the reference base, for moving the movable frame, a rectangular movable base mounted in the rectangular space and movable on the reference base along the other of the X and Y axes and stopped on the reference base and a second drive source provided on the movable frame, for moving the movable base. p With such construction, a moving plane of the movable frame and a moving plane of the movable base can be provided closely or can be substantially common. Since the movable base moves in such state and is stopped on the surface of the reference base of the surface plate, there is substantially no positional error in the height direction and, since the moving directions of the movable base and the movable frame are orthogonal in the moving planes, interference during movements is prevented and high precision positioning with respect to the magnetic disk becomes possible.

Therefore, in the XY stage of the head carriage, it is possible to set a height reference of the movable base supporting the magnetic head, etc., by using the height of the reference base as a reference to thereby obtain a high precision positioning with low vibration.

As a result, it is possible to realize an XY stage without substantial positional deviation in height direction and with high precision positioning. Further, it is possible to easily realize a head carriage having high precision positioning suitable for magnetic head or disk tester by utilizing the XY stage.

Incidentally, in order to move the movable base along the reference base and stop it thereon, a fine elevation mechanism for floating the movable base from the reference base when the movable base is moved and making the movable base in contact with the reference base to lock it when the movable base is stopped is used. Such fine elevation mechanism is to exclude contact resistance of the movable base when the latter is moved. Therefore, the air bearing disclosed in Reference No. 1 may be used to float and move the movable base and the movable base may be stopped by making the movable base in contact with the reference base by vacuum suction.

It may be possible to stop the movable base in non-contact state by using bearings such as magnetic bearings, etc., or by pressing down the movable base to the reference base to make the latter in contact with the reference base.

Further, as to be described later, it is possible to support the movable base in contact with the reference base by ball and roller bearings, to float and move the movable base by separating the movable base from the reference base by air and to rapidly stop the movable base by stopping air supply and pressing the movable base to the reference base by springs, etc. The present invention will be described with reference to the latter mechanism.

DETAILED DESCRIPTION OF THE PREFERRED EMBODIMENTS

Figure 1:
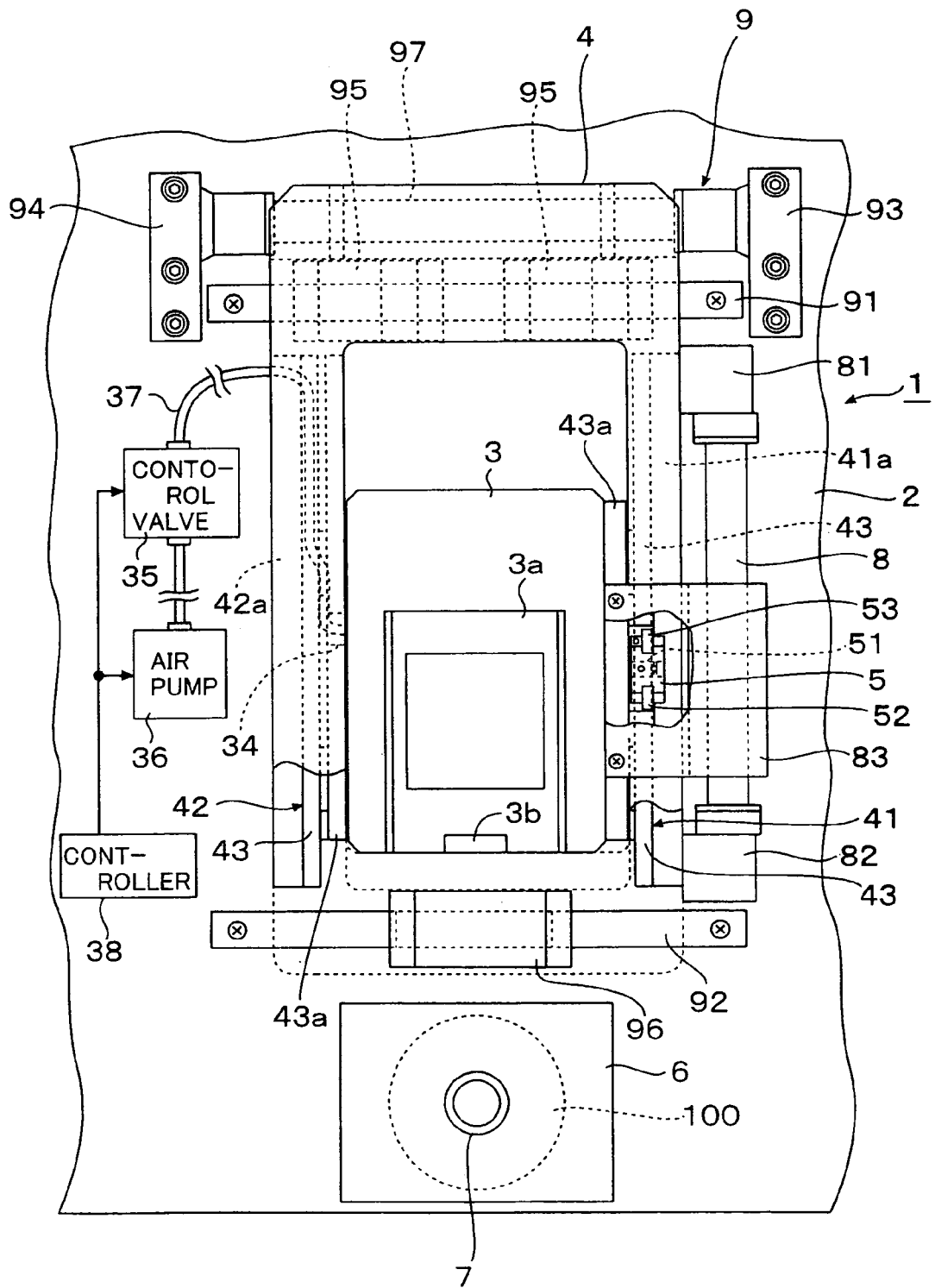
FIG. 1 is a partial plan view of a head tester according to an embodiment of the present invention, showing a head carriage having a bearing-supported movable stage.

In FIG. 1 to FIG. 5, same constructive components are depicted by same reference numerals, respectively.

In FIG. 1, a reference numeral 1 depicts a bearing-supported movable stage of a head carriage. The bearing-supported movable stage 1 includes a reference base 2 and a movable base 3, which constitutes an X stage. The reference base 2 is a surface plate of gabbro. Similarly, the movable base 3 is formed of gabbro and has surfaces, which can contact with the reference base 2. The contact surfaces (protruded portions 39 in FIG. 2 and FIG. 4(c)) of the movable base 3 are surface-plate finished. A piezoelectric stage 3a is mounted on the movable base 3. The piezoelectric stage 3a has a piezoelectric actuator and moves in an X axis direction to finely position a magnetic head. A recess portion 3b for mounting a magnetic head assembly or a magnetic head arm is formed in the piezoelectric stage 3a. The movable base 3 is on the reference base 2.

Figure 2:
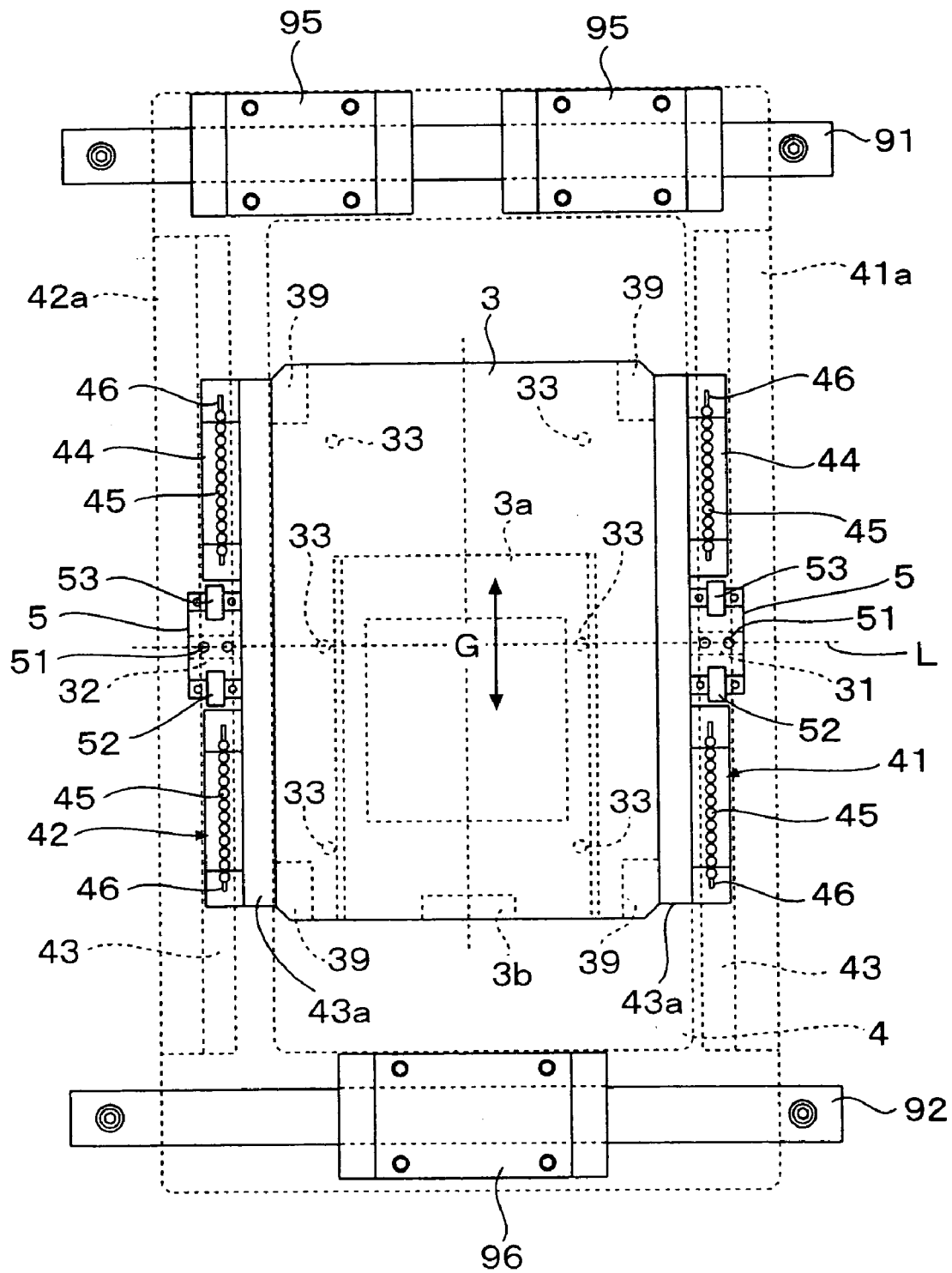
FIG. 2 is a plan view of a movable base of the head carriage shown in FIG. 1.
Figure 3:
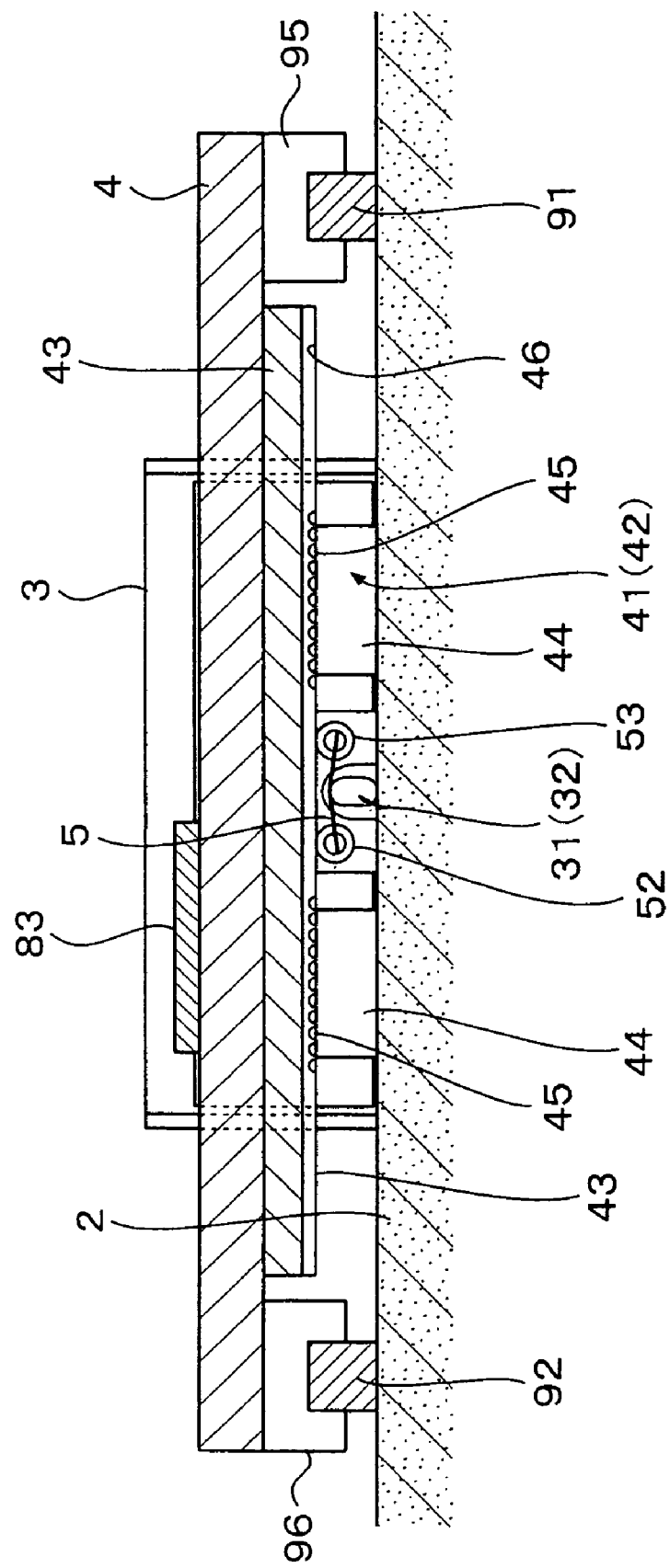
FIG. 3 is a cross sectional side view of a bearing portion.

A rectangular guide frame 4 formed of aluminum guides the movable base 3 provided within a rectangular space of the rectangular frame 4 as shown in FIG. 1 to FIG. 3. The guide frame 4 guides a movement of the movable base 3 through ball bearing units 41 and 42. The guide frame 4 constitutes a Y stage as to be described later.

As shown in FIG. 2 to FIG. 4(a), each of the ball bearing units 41 and 42 is constructed with a bearing receiving guide rail member 43 for receiving bearing balls and a movable member 44. The bearing receiving guide rail members 43 are fixed onto a rear surface of the guide frame 4 through mounting plates 41a and 42a and the movable side members 44 are fixed onto opposite side surfaces of the movable base 3 through mounting plates 43a. Thus, the movable base 3 is movably supported by the guide frame 4 through the ball bearing units 41 and 42.

In FIG. 2 to FIG. 4(a), a reference numeral 45 depicts the bearing balls provided between the receiving side guide rail member 43 and the movable side member 44. Each of the ball bearing units 41 and 42 is constructed with the above mentioned components. A reference numeral 46 depicts V grooves each provided in the receiving side guide rail member 43 and the movable side member 44.

In FIG. 1 to FIG. 3, leaf springs 5 are provided in the movable base 3 below the guide frame 4.

The leaf springs 5 operates to press the movable base 3 down to the side of the reference base 2 to thereby make the movable base 3 in fixed contact with the reference base 2. As shown in FIG. 1 to FIG. 3, center portions 51 of the leaf springs 5 are fixed to protruded portions 31 and 32 of the movable base 3, which protrude laterally at cross points of a line L, which is perpendicular to the sides of the rectangular guide frame 4 and passes through gravity center G (see FIG. 2) of the movable base 3, and the sides of the guide frame 4. Rollers 52 and 53 provided at respective opposite end portions of each leaf spring 5 are made in contact with a lower surface of the receiving side guide rail member 43 provided in the guide frame 4. Since the leaf springs 5 are pressed down by the receiving side guide rail member 43, the leaf springs urge side surfaces of the movable base 3 to an upper surface of the reference base 2. This mechanism constitutes a portion of the fine elevation mechanism, with which the movable base 3 can be lowered.

In FIG. 1, a test stage 6 of the magnetic head tester or the magnetic disk tester includes a spindle 7 for chucking a disk 100.

The movable base 3 within the guide frame 4 is movable along the X axis as the X stage. A shaft like linear motor 8 includes a magnet and a coil and constitutes a drive power source of the X stage. The linear motor 8 is provided along one side (left side in FIG. 1) of the guide frame 4 and opposite end portions of the linear motor 8 are fixed to the one (left) side of the guide frame 4 through brackets 81 and 82. An end of a movable portion 83 of the linear motor 8 is fixed to one side (left side) surface of the movable base 3 through an auxiliary mounting plate 43a. Therefore, the movable base 3 is moved along the X axis by the linear motor 8.

Guide rails 91 and 92 are provided below opposite end portions of the guide frame 4 and extend along Y axis direction. The guide rails 91 and 92 support the rear surface of the guide frame 4 through ball bearing units 95 and 96, respectively. Therefore, the guide frame 4 can move along the guide rails 91 and 92 and constitutes the Y stage. Incidentally, the ball bearing units 95 and 96 have similar constructions to those of the ball bearing units 41 and 42 and the guide rails 91 and 92 movably fix the guide frame 4 to the reference base 2. The ball bearing units 95 and 96 differ from the ball bearing units 41 and 42 in only that a receiving side member and a movable side member of each of the ball bearing units 95 and 96 have an integral structure and can not be separated from each other.

In this embodiment, the surface of the receiving side guide rails 43 in which the bearing balls 45 are received is set to substantially the same height as that of the surface of the ball bearing units 95 and 96 on which the guide rails 91 and 92 are received, as shown in FIG. 3. Therefore, the level of a moving surface of the movable base 3 (X stage) realized by the ball bearing units 41 and 42 becomes substantially the same as the level of a moving surface of the guide frame 4 (Y stage) realized by the ball bearing units 95 and 96 and the guide rails 91 and 92 and the moving directions of the movable base 3 and the guide frame 4 are orthogonal. Further, the movable base 3 is stopped on the surface of the reference base 2 by locking. Therefore, it is possible to reduce the positioning error when looked from the reference base 2.

As shown in FIG. 1 to FIG. 3, the guide frame 4 moves along the guide rails 91 and 92 extending in the Y axis direction. A shaft like linear motor 9 similar to the linear motor 8 and the guide frame 4 constitute the Y stage. The linear motor 9 is provided on the reference base 2 and extends in parallel to the guide rail 91 provided below one side portion of the guide frame 4. Opposite end portions of the linear motor 9 are fixed to the reference base 2 through brackets 93 and 94.

A moving portion 97 (FIG. 1) of the linear motor 9 has one end fixed to a rear surface of the one side portion of the guide frame 4.

Therefore, when the movable base 3 floats up from the reference base 2 by air blow, the guide frame 4 together with the movable base 3 can be moved in the Y axis direction by the linear motor 9. Thus, the movable base 3 can be moved along the X and Y axes by the linear motors 8 and 9.

Incidentally, the X axis is consistent with the radial direction of the disk 100 and the Y axis is perpendicular to the radial direction of the disk and is consistent with the skew setting direction of the magnetic head mounted on the piezoelectric stage 3a.

Now, the fine elevation mechanism for floating the movable base 3 from the reference base 2 will be described with reference to FIG. 2, which is a plan view of the movable base 3, to FIG. 4(c).

Figure 4A:
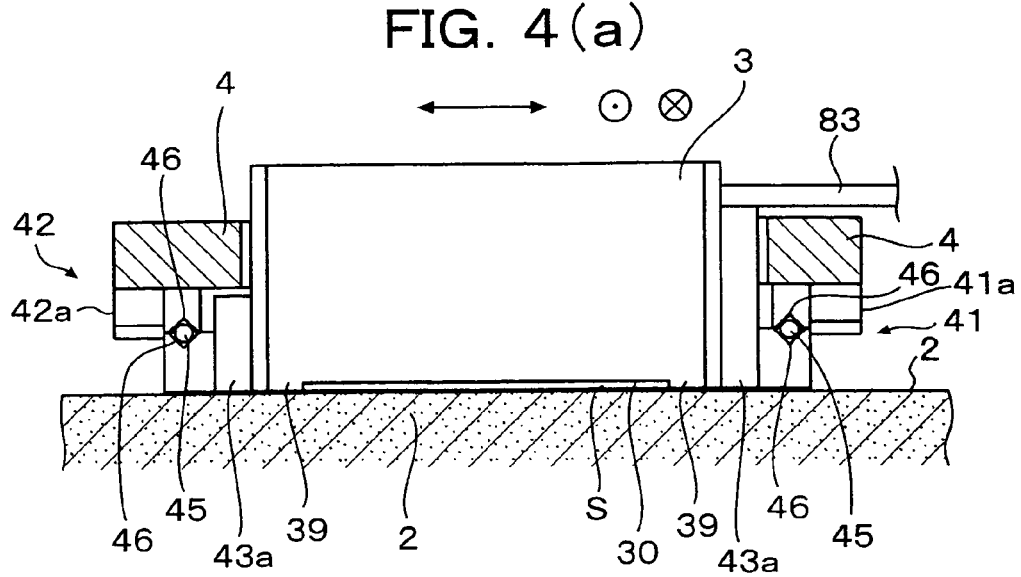
FIG. 4(a) is a cross sectional view of a bearing support structure.
Figure 4B:
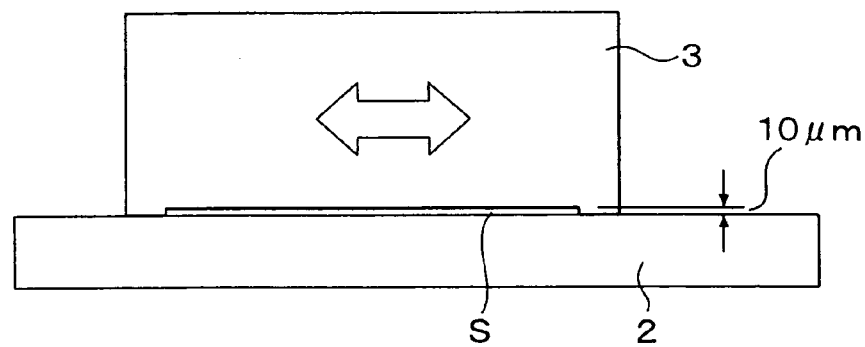
FIG. 4(b) is a view for illustrating an air deflating gap between the movable base and a reference base when the carriage is stopped.
Figure 4C:
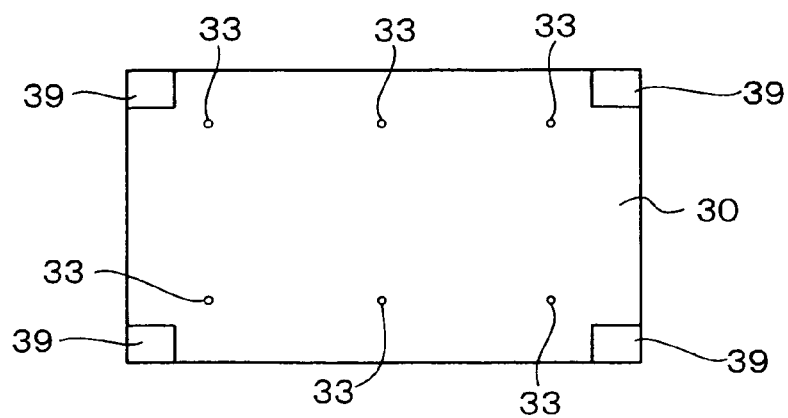
FIG. 4(c) is a view for illustrating air blow orifices formed in a rear surface of the movable base and protrusions.

As shown in FIG. 4(c) and by dotted lines in FIG. 2, 6 (six) air blow orifices 33 are formed dispersedly in a rear surface 30 of the movable base 3. Holes (not shown) having one ends connected to these air blow orifices 33 are formed in the movable base 3 correspondingly. The other ends of the holes are connected to a port 34 (FIG. 1). Under control of a controller 38, air is supplied from an air pump 36 through a control valve 35 and a tube 37 (FIG. 1) to the port 34.

Further, as shown in FIG. 2 and FIG. 4(c), rectangular protrusions 39 are formed in respective four corners of the rear surface of the movable base 3. These protrusions 39 are protruded from the rear surface 30 of the movable base 3 by 5 μm to 50 μm to form a contact plane with respect to the reference base 2. Surfaces of the protrusions 39 are surface-plate finished and an area of the surface of the protrusion 39 is selected one of the range from 5 mm×5 mm to 10 mm×50 mm. Therefore, as shown in FIG. 4(a) and FIG. 4(c), the rear surface 30 of the movable base 3 is recessed to relieve air supplied from the air blow orifices 33.

In order to immediately bring the leaf spring 5 active when the movable base 3 enters into the stop control, an air relief gap S on the order of 10 μm as selected one of the range from 5 μm to 50 μm, is provided between the reference base 2 and the movable base 3 when they contact with each other.

Now, a movement of the movable base 3 in the movable stage 1 will be described. First, when the control valve 35 is controlled by the controller 38 and pressurized air is supplied from the air pump 36, air is blown from the six air blow orifices 33 to float up the movable base 3 from the reference base 2 against the pressing down force of the movable base 3 due to the leaf springs 5. In this case, due to weight of the rectangular guide frame 4 formed of aluminum, the rectangular guide frame is bent when it floats. A floating amount in this case is on the order of 10 μm with respect to the protrusions 39.

Incidentally, since the rectangular guide frame 4 is bent when it floats up through the fine elevation mechanism for floating the movable base 3, the receiving side guide rail 43 of the ball bearing unit 41 (42) may be rigidly integrated with the movable side member 44 thereof and there is a clearance between the receiving side guide rail 43 and the moving side member 44, for allowing the moving side member 44 to float up by at least about 5 μm.

In the floating state of the moving side member 44, the magnetic head (not shown) is positioned at a predetermined track position on the disk 100 by the linear motors 8 and 9.

At the time when this positioning is completed, the control valve 35 is controlled by the controller 38 to stop air supply from the air pump 36. Therefore, the movable base 3 is pressed to the reference base 2 by the leaf springs 5 and stopped on the reference base. FIG. 4(a) illustrates this state. In this case, since the leaf springs 5 may press down the movable base 3 by about 10 μm, the movable base 3 is rapidly made in contact with the reference base 2 and locked. Incidentally, since the floating distance of the movable base 3 is small enough to reduce or eliminate sliding friction with respect to the reference base 2, it may be in a range from several tens microns to several hundreds microns in view of the rapid stopping of the movable base 2.

At the time when the movable base 3 is stopped, the bending of the aluminum rectangular guide frame 4 is removed and the movable base 3 is pressed to the reference base 2 by the leaf springs 5. The receiving side guide rails 43 are urged downward to the side of the movable side members 44 and made in contact with the bearing balls 45. Therefore, the receiving side guide rails 43, the movable side members 44 and the bearing balls 45 constitute usual integral bearings or more rigid ball bearings. In the floating state of the movable base 3, a pressing force is exerted between the receiving side guide rails 43, the moving side members 44 and the bearing balls 45 due to negative pressure caused by air blow from the gap S, so that there is substantially no deviation between them or backrush, etc. Therefore, high precision movement becomes possible. Since the leaf springs 5 act in the stopped position, the movable base 3 can be stopped rapidly without positioning error.

Figure 5A:
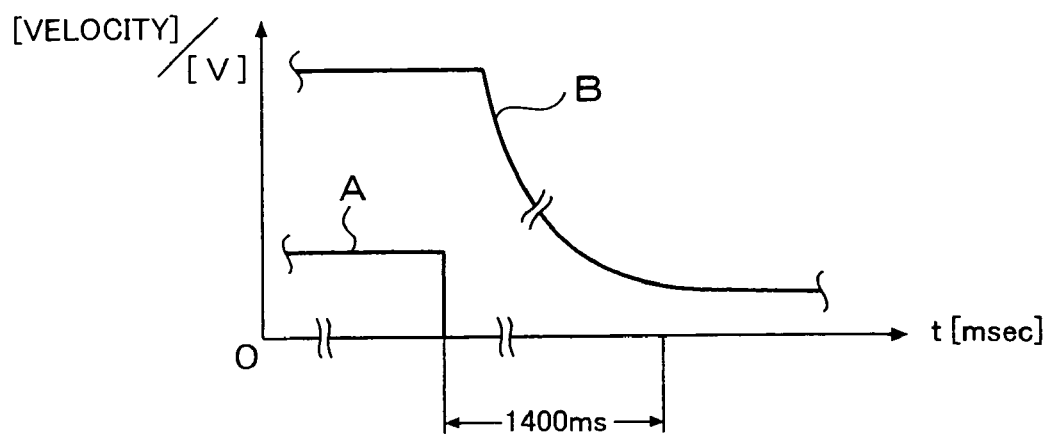
FIG. 5(a) and FIG. 5(b) illustrate an effect of a pressing lock.
Figure 5B:
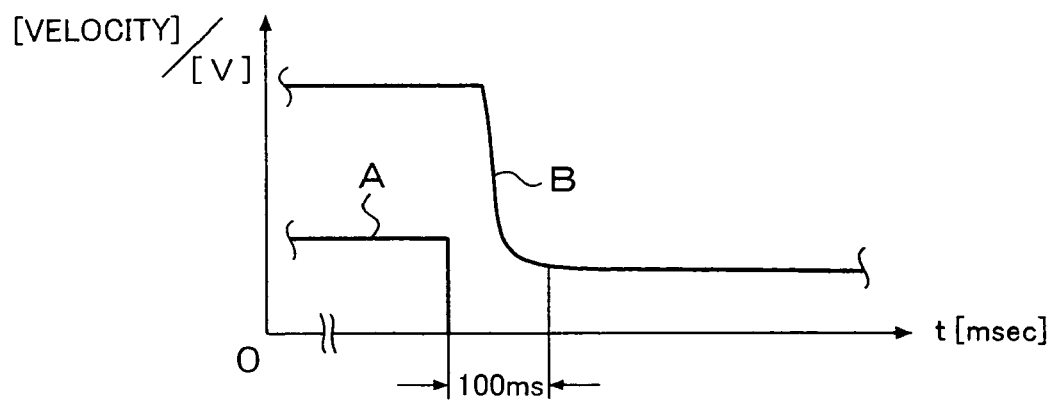
Figure 6:
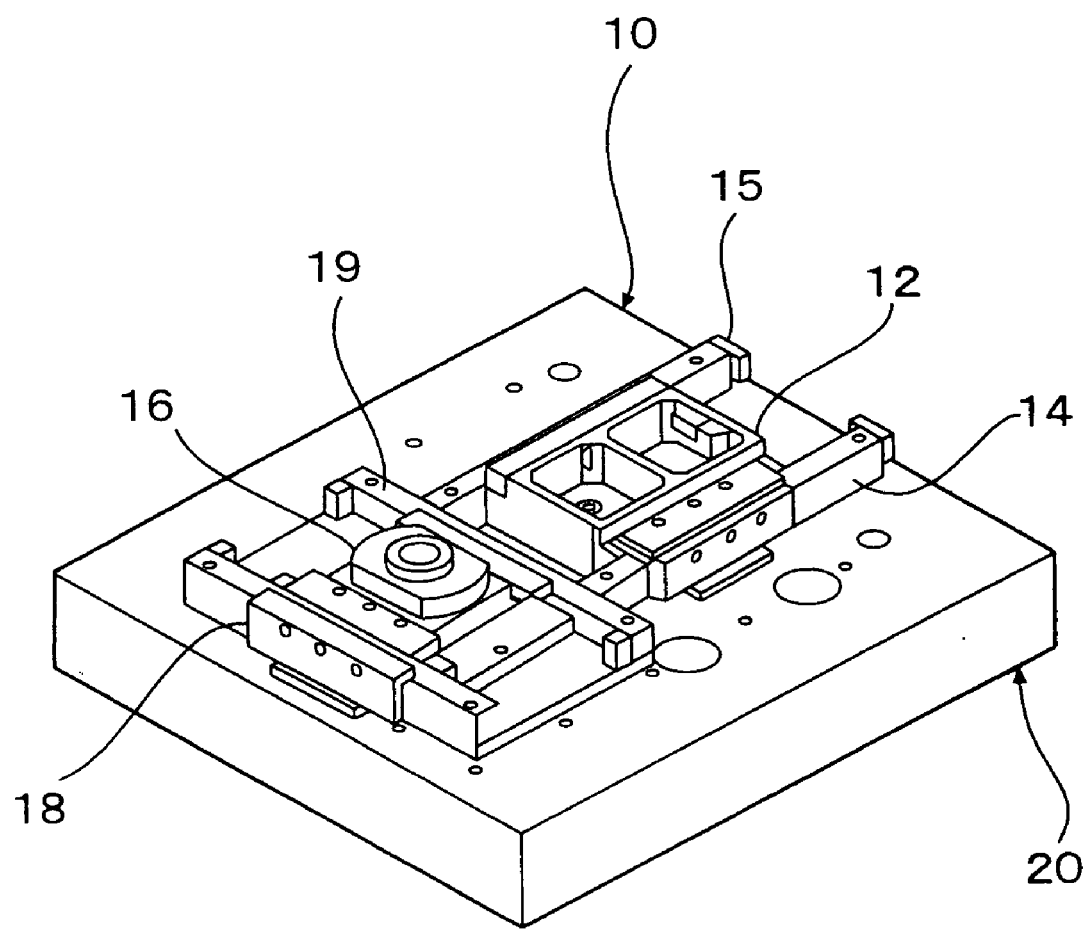
FIG. 6 shows an example of a conventional air-bearing supported movable stage.

FIG. 5(a) is a graph showing the stopping effect of the movable base 3 when there is no gap S provided and FIG. 5(b) is a graph when the gap S is provided. In these figures, capital letter A indicates a control signal from the controller 38 to be supplied to the control valve 35 of the movable stage 1 and B a moving speed of the movable base 3. In the case where the gap S is provided, a time required to stop the movable base 3 of the movable stage 1 is 100 msec or shorter when the movable base 3 enters into the stopping state by making the control signal A in "L" (Low level), as shown in FIG. 5(b). Without the gap S, it takes 1400 msec or more, as shown in FIG. 5(a). In order to realize such rapid stopping, the gap S is preferably in a range from 5 µm to 50 µm.

Although the movable base 3 is lifted up from the surface of the reference base 2 by using the air blow mechanism in the embodiment shown in FIG. 1, it may be possible to float the movable base 3 by utilizing magnetic repulsion. In such case, a coil is provided on the side of the receiving side guide rail 43 and a permanent magnet is provided on the side of the movable side member 44. Magnetic repulsive force is generated by supplying current to the coil on the receiving side guide rail 43 to thereby float the movable side member 44 from the surface of the reference base 2. When the receiving side guide rail 43 and the movable side member 44 form a magnetic bearing structure, bearing balls required between the receiving side guide rail 43 and the movable side member 44 become unnecessary. When such magnetic bearing structure is employed, it is possible to make the whole mechanism as a linear motor mechanism by providing magnets, etc., on side faces of the movable member 44 for maintaining a horizontal positional relation.

When the movable base 3 is lifted up by using the receiving side guide rail 43 in the permanent magnet side and the movable side member 44 in the coil side, it is necessary to add a structure for feeding current to the movable side member 44.

In the case where the X stage is constructed such that the movable base 3 is supported within the guide frame 4 and is directly fixed to the reference base 2 when stopped as in the described embodiment, it is possible to move the Y stage in height direction using the level of the reference base 2 as a reference. Therefore, it is possible to move the movable stage in the X and Y axis directions within substantially the same plane. In such case, it is possible to move the X stage and the Y stage on the surface of the reference base 2, so that the positioning error in the X and Y directions becomes smaller and the positioning error in the height direction is substantially eliminated. Therefore, high precision positioning becomes possible. When the movable base 3 is pressed by the leaf spring as in this embodiment, pressing load is not changed unlike the vacuum adhesion. Therefore, the downward movement of the movable base becomes stabilized and the time required to stabilize the stopping operation can be reduced.

The supporting structure of the movable base is not limited to the ball bearing structure. For example, a ball and roller bearing structure or an air bearing structure may be used instead of the ball bearing structure.

The X axis and the Y axis may be exchanged. It is enough that these axes are linear.

The air blow orifices of the fine elevation mechanism of the described embodiment may be provided in not the movable base but the reference base. Further, the number of the air blow orifices is not limited to six. Further, the leaf springs used in the described embodiment may be mounted on not the movable base but the reference base. Further, coil springs or other resilient members may be used in lieu of the leaf springs. Further, the described pressing mechanism for pressing down the movable base is a mere example and any elevation mechanism can be used, provided that the movable base is separated from the surface (reference surface) of the reference base when the movable base is moved and then stopped on the reference surface.

The configuration of the guide frame is not limited to perfect rectangular as in the described embodiment. For example, one of the four sides of the rectangular guide frame may be removed. Further, although the movable stage or the XY stage of the head carriage has described, the present invention can be generally applied to bearing-supported movable stages requiring high speeds and high precision positioning. Further, the present movable stage can be utilized in a magnetic disk tester and a magnetic head tester.

What is claimed is:

1. A head cartridge having an XY stage supported by a surface plate reference base, comprising:

a movable frame movable on said reference base along one of an X axis and a Y axis, said movable frame having a rectangular space inside thereof; a first drive source provided in said reference base, for moving said movable frame; a rectangular movable base mounted within said rectangular space of said rectangular movable frame, said rectangular movable base being movable on said reference base along the other of the X and Y axes and stopped on said reference base; and a second drive source provided in said movable frame, for moving said movable base;

a fine elevation mechanism for floating said movable base from said surface of said reference base when said movable base is moved and making said movable base in contact with said surface of said reference base when said movable base is stopped, wherein said reference base is formed of stone and a surface of said movable base, which is in contact with said reference base, is surface-plate finished.

wherein said movable frame is rectangular in plan view, a first bearing means is provided on opposing two sides of said rectangular movable frame for supporting said movable base movably, a second bearing means is provided between the other opposing two sides of said movable frame and said reference base and said first and second drive sources are linear motors, respectively, and wherein said first bearing means has a fixed side member and a movable side member, said fixed side member of said first bearing means fixed onto a rear surface of said rectangular movable frame, said movable side member of said first bearing means fixed onto said movable base.

2. A head carriage as claimed in claim 1, wherein said first and second bearing means are ball-and-roller bearings, respectively, a movable plane of said movable base supported by said first ball-and-roller bearing is substantially the same as a movable plane of said reference base supported by said second ball-and-roller bearing.

3. A head carriage as claimed in claim 2, wherein said first ball-and-roller bearing is a ball bearing, said movable frame is formed of a flexible material, which is bent when said movable base is separated from said reference base, movable side members and fixed side members of said ball bearings are fixed to opposing two sides of said movable base and to the other opposing two sides of said movable base, respectively, said movable base is pressed to said reference base and locked thereon by said fine elevation mechanism when said movable base is stopped, in which said fixed side members and said movable side members of said ball bearings are in contact with each other through bearing balls.

4. A head carriage having an XY stage including a movable base for supporting a magnetic head assembly or a magnetic head cartridge and a surface plate reference base, said movable base being supported by said reference base through bearings, said XY stage comprising:
- a movable frame movable on said reference base along one of an X axis and a Y axis, said movable frame having a rectangular space inside thereof;
- a first drive source provided in said reference base, for moving said movable frame;
- a rectangular movable base mounted within said rectangular space of said rectangular movable frame, said rectangular movable base being movable on said reference base along the other of the X and Y axes and stopped on said reference base;
- a second drive source provided in said movable frame, for moving said movable base; and
- a fine elevation mechanism for floating said movable base from said surface of said reference base when said movable base is moved and making said movable base in contact with said surface of said reference base when said movable base is stopped, wherein
- said reference base is formed of stone and a surface of said movable base, which is in contact with said reference base, is surface-plate finished;
- said movable base is supported by said reference base through a bearing means;
- said movable frame is rectangular in plan view and said bearing means has a fixed side member, a movable side member and a ball bearing having bearing balls between said fixed side member and said movable side member;
- said fixed side member of said bearing means is rigidly integrated with said movable member thereof; and
- said movable frame is bent when said movable base floats up.

5. A head carriage having an XY stage including a movable base for supporting a magnetic head assembly or a magnetic head cartridge and a surface plate reference base, said movable base being supported by said reference base through bearings, said XY stage comprising:
- a movable frame movable on said reference base along one of an X axis and a Y axis, said movable frame having a rectangular space inside thereof;
- a first drive source provided in said reference base, for moving said movable frame;
- a rectangular movable base mounted within said rectangular space of said rectangular movable frame, said rectangular movable base being movable on said reference base along the other of the X and Y axes and stopped on said reference base;
- a second drive source provided in said movable frame, for moving said movable base; and
- a fine elevation mechanism for floating said movable base from said surface of said reference base when said movable base is moved and making said movable base in contact with said surface of said reference base when said movable base is stopped, wherein
- said fine elevation mechanism comprises pressing means provided in said movable frame or said reference base, for pressing said movable base toward said reference base to make said movable base in contact with said surface of said reference base to thereby lock down said movable base on said surface of said reference base, and a movable base floating mechanism for floating said movable base from said surface of said reference base against pressing force of said pressing member, said movable base being moved while supported by said reference base through said bearings, and
- one side of said rectangular space of said movable frame is opened.

6. A magnetic head tester for testing a magnetic head by using a head carriage including an XY stage including a movable base for supporting a magnetic head assembly or a magnetic head cartridge and a surface plate reference base, said movable base being supported by said reference base through bearings, said XY stage comprising:
- a movable frame movable on said reference base along one of an X axis and a Y axis, said movable frame having a rectangular space inside thereof;
- a first drive source provided in said reference base, for moving said movable frame;
- a rectangular movable base mounted within said rectangular space of said rectangular movable frame, said rectangular movable base being movable on said reference base along the other of the X and Y axes and stopped on said reference base;
- a second drive source provided in said movable frame, for moving said movable base; and
- a fine elevation mechanism for floating said movable base from said surface of said reference base when said movable base is moved and making said movable base in contact with said surface of said reference base when said movable base is stopped, wherein
- said reference base is formed of stone and a surface of said movable base, which is in contact with said reference base, is surface-plate finished;
- said movable base is supported by said reference base through a bearing means;
- said movable frame is rectangular in plan view and said bearing means has a fixed side member, a movable side member and a ball bearing having bearing balls between said fixed side member and said movable side member;
- said fixed side member of said bearing means is rigidly integrated with said movable member thereof; and
- said movable frame is bent when said movable base floats up.

7. A magnetic head tester for testing a magnetic head by using a head carriage including an XY stage including a movable base for supporting a magnetic head assembly or a magnetic head cartridge and a surface plate reference base, said movable base being supported by said reference base through bearings, said XY stage comprising:
- a movable frame movable on said reference base along one of an X axis and a Y axis, said movable frame having a rectangular space inside thereof;
- a first drive source provided in said reference base, for moving said movable frame;
- a rectangular movable base mounted within said rectangular space of said rectangular movable frame, said rectangular movable base being movable on said reference base along the other of the X and Y axes and stopped on said reference base;
- a second drive source provided in said movable frame, for moving said movable base; and
- a fine elevation mechanism for floating said movable base from said surface of said reference base when said movable base is moved and making said movable base in contact with said surface of said reference base when said movable base is stopped, wherein
- said fine elevation mechanism comprises pressing means provided in said movable frame or said reference base, for pressing said movable base toward said reference base to make said movable base in contact with said surface of said reference base to thereby lock down said movable base on said surface of said reference base, and a movable base floating mechanism for floating said movable base from said surface of said reference base against pressing force of said pressing member, said movable base being moved while supported by said reference base through said bearings, and one side of said rectangular space of said movable frame is opened.

8. A magnetic disk tester for testing a magnetic disk by using a head carriage including an XY stage including a movable base for supporting a magnetic head assembly or a magnetic head cartridge and a surface plate reference base, said movable base being supported by said reference base through bearings, said XY stage comprising:

a movable frame movable on said reference base along one of an X axis and a Y axis, said movable frame having a rectangular space inside thereof;

a first drive source provided in said reference base, for moving said movable frame;

a rectangular movable base mounted within said rectangular space of said rectangular movable frame, said rectangular movable base being movable on said reference base along the other of the X and Y axes and stopped on said reference base;

a second drive source provided in said movable frame, for moving said movable base;

a fine elevation mechanism for floating said movable base from said surface of said reference base when said movable base is moved and making said movable base in contact with said surface of said reference base when said movable base is stopped, wherein said reference base is formed of stone and a surface of said movable base, which is in contact with said reference base, is surface-plate finished;

said movable base is supported by said reference base through a bearing means;

said movable frame is rectangular in plan view and said bearing means has a fixed side member, a movable side member and a ball bearing having bearing balls between said fixed side member and said movable side member;

said fixed side member of said bearing means is rigidly integrated with said movable member thereof; and said movable frame is bent when said movable base floats up.

9. A magnetic disk tester for testing a magnetic disk by using a head carriage including an XY stage including a movable base for supporting a magnetic head assembly or a magnetic head cartridge and a surface plate reference base, said movable base being supported by said reference base through bearings, said XY stage comprising;

a movable frame movable on said reference base along one of an X axis and a Y axis, said movable frame having a rectangular space inside thereof;

a first drive source provided in said reference base, for moving said movable frame;

a rectangular movable base mounted within said rectangular space of said rectangular movable frame, said rectangular movable base being movable on said reference base along the other of the X and Y axes and stopped on said reference base;

a second drive source provided in said movable frame, for moving said movable base; and a fine elevation mechanism for floating said movable base from said surface of said reference base when said movable base is moved and making said movable base in contact with said surface of said reference base when said movable base is stopped, wherein said fine elevation mechanism comprises pressing means provided in said movable frame or said reference base, for pressing said movable base toward said reference base to make said movable base in contact with said surface of said reference base to thereby lock down said movable base on said surface of said reference base, and a movable base floating mechanism for floating said movable base from said surface of said reference base against pressing force of said pressing member, said movable base being moved while supported by said reference base through said bearings, and one side of said rectangular space of said movable frame is opened.

10. A magnetic head tester for testing a magnetic head by using a head carriage including an head cartridge having an XY stage supported by a surface plate reference base, comprising:

a movable frame movable on said reference base along one of an X axis and a Y axis, said movable frame having a rectangular space inside thereof; a first drive source provided in said reference base, for moving said movable frame; a rectangular movable base mounted within said rectangular space of said rectangular movable frame, said rectangular movable base being movable on said reference base along the other of the X and Y axes and stopped on said reference base; and a second drive source provided in said movable frame, for moving said movable base;

a fine elevation mechanism for floating said movable base from said surface of said reference base when said movable base is moved and making said movable base in contact with said surface of said reference base when said movable base is stopped, wherein said reference base is formed of stone and a surface of said movable base, which is in contact with said reference base, is surface-plate finished.

wherein said movable frame is rectangular in plan view, a first bearing means is provided on opposing two sides of said rectangular movable frame for supporting said movable base movably, a second bearing means is provided between the other opposing two sides of said movable frame and said reference base and said first and second drive sources are linear motors, respectively, and wherein said first bearing means has a fixed side member and a movable side member, said fixed side member of said first bearing means fixed onto a rear surface of said rectangular movable frame, said movable side member of said first bearing means fixed onto said movable base.

11. A magnetic disk tester for testing a magnetic disk by using a head carriage including an XY stage supported by a surface plate reference base, comprising:

a movable frame movable on said reference base along one of an X axis and a Y axis, said movable frame having a rectangular space inside thereof; a first drive source provided in said reference base, for moving said movable frame; a rectangular movable base mounted within said rectangular space of said rectangular movable frame, said rectangular movable base being movable on said reference base along the other of the X and Y axes and stopped on said reference base; and a second drive source provided in said movable frame, for moving said movable base;

a fine elevation mechanism for floating said movable base from said surface of said reference base when said movable base is moved and making said movable base in contact with said surface of said reference base when said movable base is stopped, wherein said reference base is formed of stone and a surface of said movable base, which is in contact with said reference base, is surface-plate finished.

wherein said movable frame is rectangular in plan view, a first bearing means is provided on opposing two sides of said rectangular movable frame for supporting said movable base movably, a second bearing means is provided between the other opposing two sides of said movable frame and said reference base and said first and second drive sources are linear motors, respectively, and wherein said first bearing means has a fixed side member and a movable side member, said fixed side member of said first bearing means fixed onto a rear surface of said rectangular movable frame, said movable side member of said first bearing means fixed onto said movable base.

* * * * *